United States Patent Office 3,642,879
Patented Feb. 15, 1972

3,642,879
S-(VINYLBENZYL)ISOTHIOURONIUM SALTS
David P. Sheetz and Edwin C. Steiner, Midland, Mich., assignors to The Dow Chemical Company, Midland, Mich.
No Drawing. Filed Feb. 9, 1965, Ser. No. 431,441
Int. Cl. C07c *123/00, 129/00*
U.S. Cl. 260—501.14                      6 Claims

ABSTRACT OF THE DISCLOSURE

S-(vinylbenzyl)isothiouronium compounds of the general formula

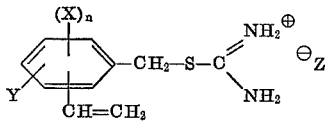

wherein X and Y are conventional substituents and $n$ is 0–3. The compounds have biological uses and are monomers to be polymerized.

---

The new family of S-(vinylbenzyl)isothiouronium salt monomers of the present invention have the formula

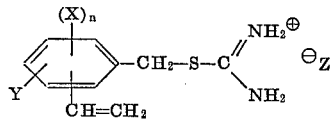

In this and succeeding formulae, Y represents hydrogen and occupies a position ortho to the vinyl substituent, X represents chlorine, bromine or lower alkyl, Z represents a member of the group consisting of $—Cl^{\ominus}$, $—Br^{\ominus}$, $—NO_3^{\ominus}$, $—OOCCH_3^{\ominus}$, and $—ClO_4^{\ominus}$, and $n$ represents one of the integers 0, 1, 2, and 3. In the present specification and claims lower alkyl represents alkyl containing 1, 2, 3, or 4 carbon atoms or from 1 to 2, to 3, to 4 carbon atoms. These monomeric compounds are crystalline solid materials which are soluble in water and of low solubility in common organic solvents. The materials are useful as pesticides for the control of various plant, insect, bacterial, and fungal pests such as Southern armyworms, crabgrass, *Staphylococcus aureus*, *Erwinia cartovora*, and *Aspergillus terrus*.

The monomeric compounds of the present invention wherein Z represents chloride or bromide can be prepared by reacting thiourea with a vinylbenzyl halide compound having the formula

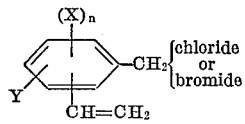

The reaction can be conveniently carried out in the presence of an inert organic solvent as reaction medium. Suitable reaction mediums include ethanol, methanol, isopropanol, butanol and diethyl ether. The proportions of the reactants to be employed are not critical, some of the desired product being formed upon combining the reactants in any proportions. However, the reaction consumes the vinylbenzyl halide compound (bromide or chloride) and the thiourea reactants in substantially equimolar amounts and the use of the reactants in such proportions is preferred when optimum yields are desired. Representative vinylbenzyl halide compounds include 2,3,4 - trimethyl - 5-vinylbenzyl chloride; 2,6-diethyl-3-vinylbenzyl bromide; 2,5,6 - tribromo - 4-vinylbenzyl bromide; 5 - isopropyl-3-vinylbenzyl chloride; 2,3,4-tribromo - 6-vinylbenzyl bromide; 4-methyl-2-vinylbenzyl chloride; 2,5,6 - triethyl-3-vinylbenzyl chloride; 3,4-dipropyl - 6-vinylbenzyl bromide; 2-bromo-6-vinylbenzyl chloride; and 2-chloro-6-vinylbenzyl chloride. The reaction proceeds readily at temperatures between 25 and 150° C. In a convenient method, the reaction is carried out at the boiling temperature of the reaction mixture and under reflux. Following the reaction, the temperature of the reaction mixture is maintained within the reaction temperature range for a short period to insure completion of the reaction.

In carrying out the reaction, the vinylbenzyl halide compound, the thiourea and the reaction medium, if employed, are combined in any convenient order or fashion. Following the contacting of the reactants the temperature of the reaction mixture is maintained at a temperature within the reaction temperature range for a short period of time. Thereafter, the reaction mixture is allowed to attain room temperature. During such cooling period, the desired product oftentimes precipitates in the reaction mixture as a crystalline solid. Following the cooling period, the desired product can be obtained by such conventional procedures as evaporation of the reaction mixture to obtain the product as a residue, or filtration, if the desired product has precipitated in the reaction mixture. The crystalline S-(vinylbenzyl)isothiouronium chloride or bromide product can then be employed in pesticidal applications or further purified by conventional procedures such as washing with an organic solvent and recrystallization.

Compounds wherein Z represents nitrate, acetate, or perchlorate are readily prepared from the S-(vinylbenzyl)isothiouronium halides prepared as described in the foregoing paragraphs by use of an anion exchange resin containing replaceable nitrate, acetate, or perchlorate ions. In such procedures, the S-vinylbenzyl)- isothiouronium halide is dissolved in water and the resulting solution added to a column containing the anion exchange resin in the desired salt form e.g. nitrate, acetate or perchlorate. The aqueous S - (vinylbenzyl)isothiouronium nitrate, acetate or perchlorate containing effluent is collected and the desired product separated by conventional procedures such as evaporation of the low boiling constituents to obtain the product as a residue. In an alternative procedure, the compounds wherein Z represents nitrate or perchlorate are prepared by reacting the S-(vinylbenzyl)isothiouronium halide with at least an equimolar amount of silver nitrate or silver perchlorate in aqueous solution. As a result of this procedure, a silver halide is produced as a biproduct together with S-(vinylbenzyl)isothiouronium nitrate or perchlorate. Following the reaction, the reaction mixture is filtered to remove the insoluble silver halide. Thereafter the S-(vinylbenzyl)isothiouronium salt is isolated by such conventional procedures as evaporation of the reaction medium.

The S-(vinylbenzyl)isothiouronium salts can be interpolymerized with one or more comonomers having a terminal ethylenic group attached by a single bond to a carbon atom that is multiply bonded to another atom having an atomic number of 6, 7 or 8. It is essential that the comonomer contain the conjugation as above set forth in order to obtain interpolymers. Preferred comonomers include the styrenes, the butadienes, the acrylonitriles, the methacrylonitriles, and the acrylic and methacrylic acids and their esters. Representative comonomers to be employed include styrene, 1,3-butadiene, acrylanilide, acrylonitrile, methacrylonitrile, vinylbenzyl diethanol sulfonium chloride, sodium styrene sulfonate, acrylamide, methacrylamide, methyl methacrylate, ethyl acrylate, hexyl acrylate, α-methylstyrene, 2-sulfoethyl methacrylate sodium salt, ar-methylstyrene, ar-cyanostyrene, ar-methoxystyrene, ar-ethylstyrene, vinylnaphthalene, 2-hydroxylethyl acrylate, divinylnaphthalene, 2,3-dimethyl-1,3-butadiene and phenyl acrylate. Ar-as employed herein means that the substituent is located on the aromatic nucleus of the styrene moiety.

The interpolymerization reactions are carried out in the presence of a free radical catalyst and also in the presence of an inert gas that will not react with the free radical of the comonomers previously defined. Representative free radical catalysts include hydrogen peroxide, benzoyl peroxide, potassium persulfate, lauroyl peroxide, tertiary butyl hydroperoxide and azobisisobutyronitrile. Inert gases which can be conveniently employed include nitrogen, helium, carbon dioxide, methane, etc. The interpolymerization takes place readily at temperatures between 10° C. and 150° C. but it is generally preferred that it be carried out at temperatures between 40 and 100° C.

The interpolymerization can be carried out in mass, i.e., in substantial absence of inert liquid medium; in solution, i.e. in a solvent for the monomers; or in emulsion or suspension, i.e. in a liquid medium which is not a solvent for the final product. Due to the water solubility of the new monomers of the present invention it is advantageous to carry out the polymerization reaction in an aqueous medium. This is true even though the other comonomers are not water soluble. When mass, solution, emulsion or suspension polymerization is employed, the reaction can be carried out at practically any concentration of the monomers. Although the monomers are polymerizable in all ratios, it is preferable to employ the S-(vinylbenzyl) isothiouronium salt monomer in proportions such that the S-(vinylbenzyl)isothiouronium monomer constitutes at least 0.5 percent of the final polymer.

In practicing the method of the present invention, the free radical catalyst, S-(vinylbenzylisothiouronium salt, and the comonomer(s) are combined in any order or fashion. In a preferred procedure, the reactants are mixed with a polymerization medium which is inert for the monomers such as water, methanol, ethanol or acetone to form a mixture containing the total concentration of monomers between about 5 and 50 percent by weight. In a preferred procedure, water is employed as the reaction medium. It may be desirable to add ferric, ferrous ions or other free radical initiators to the reaction mixture to initiate the formation of free radicals when employing certain of the free radical catalysts such as hydrogen peroxide. Following the contacting of the reactants, the system is deoxygenated and placed in an inert gaseous atmosphere. The reaction mixture is then maintained at a temperature within the reaction temperature range for a period of time to insure substantially complete conversion of the monomers to polymer. Following the reaction period the interpolymer can be separated from the reaction mixture by such conventional procedures as filtration or addition of an organic solvent to the reaction mixture in order to cause the precipitation of the desired product and subsequent filtration to accomplish the separation of that product.

The following examples are merely illustrative and are not intended to be limiting.

EXAMPLE 1

2-thio-2-(4'-vinylbenzyl)isothiouronium chloride

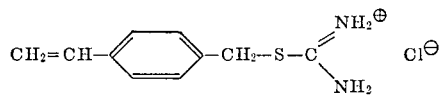

A mixture of thiourea (76 grams; 1 mole) and 4'-vinylbenzyl chloride (152.5 grams; 1 mole) is dispersed in 500 milliliters of absolute ethanol. The reaction mixture is heated with stirring at the boiling temperature and under reflux for four hours. Thereafter, the mixture is allowed to cool to room temperature. During the cooling period, the 2-thio-4'-(vinylbenzyl)isothiouronium chloride product precipitates as a crystalline solid. The crystals are separated by filtration, air dried and recrystallized from tetrahydrofuran. The recrystallized product melts at 157.5–160° C. Infrared analysis confirms the identity of the product as 2-thio-2-(4'-vinylbenzyl)-isothiouronium chloride.

EXAMPLE 2

2-thio-2-(3'-vinyl-4'-sec.-butylbenzyl)-isothiouronium nitrate

A mixture of thiourea (38 grams; 0.5 mole) and 3'-vinyl - 4' - sec.-butylbenzyl chloride (105 grams; 0.5 mole) is dispersed in 300 milliliters of diethyl ether. The resulting mixture is heated with stirring at the boiling temperature and under reflux for 6 hours. Thereafter, the mixture is allowed to cool to room temperature; whereupon the reaction mixture is evaporated under reduced pressure to obtain the 2-thio-2-(3'-vinyl-4'-sec.-butylbenzyl)-isothiouronium chloride product as a solid residue. 2 - thio - 2 - (3'-vinyl-4'-sec.-butylbenzyl)isothiouronium chloride has a molecular weight of 384. The isothiouronium chloride product is then dissolved in water and silver nitrate (85 grams; 0.5 mole) is added thereto portionwise with stirring at room temperature. The stirring is thereafter continued at room temperature for one hour. Following this period, the reaction mixture is filtered to remove the precipitated AgCl which formed during the reaction, and the filtrate thereafter collected. This filtrate is subjected to evaporation to remove the low boiling constituents and obtain the 2-thio - 2 - (3'-vinyl-4'-sec.-butylbenzyl)isothiouronium nitrate (molecular weight 399) as a solid residue.

EXAMPLE 3

2-thio-2-(2',3',6'-trichloro-5'-vinylbenzyl)isothiouronium acetate

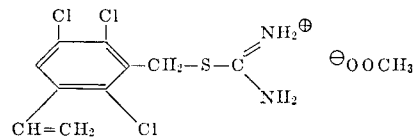

A mixture of thiourea (38 grams; 0.5 mole) and 2,3,6-trichloro - 5' - vinylbenzyl bromide (111 grams; 0.5 mole) is dispersed with stirring in 200 milliliters isopropanol. Following the contacting of the reactants, the reaction mixture is heated at the boiling temperature and under reflux for 6 hours. Thereafter, the reaction mixture is cooled to room temperature. The 2 - thio - 2-(2',3',6'-trichloro-5'-vinylbenzyl)isothiouronium bromide (molecular weight 479) which precipitates during the cooling period is collected by filtration. This product is then dispersed in water and poured on an ion exchange column containing a strongly basic anion exchange resin in the acetate form. The column is washed with water to elute the desired product. The aqueous eluent is collected and the water removed by evaporation to obtain the 2-thio-2-(2',3',6' - trichloro - 5' - vinylbenzyl)isothiouronium acetate product as a solid residue. 2 - thio - 2-(2',3',6'-trichloro-5'-vinylbenzyl)isothiouronium acetate has a molecular weight of 458.

The following compounds of the present invention are prepared in a similar fashion.

2 - thio - 2 - (4' - vinyl - 3'-chlorobenzyl)isothiouronium hydrobromide (molecular weight 408) by reacting together 4-vinyl-3-chlorobenzyl bromide and thiourea.

2 - thio - 2 - (4' - vinyl-2'-bromobenzyl)isothiouronium acetate (molecular weight 432) by reacting together 2-thio - 2 - (4' - vinyl - 2'-bromobenzyl)isothiouronium bromide an anion exchange resin containing a replaceable acetate moiety.

2 - thio - 2 - (2'-vinyl-4'-propylbenzyl)isothiouronium nitrate (molecular weight 386) by reacting together 2-thio - 2 - (2' - vinyl - 4'-propylbenzyl)isothiouronium chloride and silver nitrate.

2 - thio - 2 - (3' - vinyl-4'-chlorobenzyl)isothiouronium perchlorate (molecular weight 388) by reacting together 2 - thio - 2 - (3' - vinyl-4'-chlorobenzyl)isothiouronium chloride and silver perchlorate.

2 - thio - 2 - (4' - vinyl-3'-ethylbenzyl)isothiouronium chloride (molecular weight 357) by reacting together 3-vinyl-4-chlorobenzyl chloride and thiourea.

2 - thio - 2 - (2'-vinyl-4'-methylbenzyl)isothiouronium acetate (molecular weight 367) by reacting together 2-thio-2-(2'-vinyl-4-methylbenzyl)isothiouronium bromide and an anion exchange resin containing replaceable acetate anions.

2 - thio - 2 - (2',3'-dimethyl-5'-vinylbenzyl)isothiouronium nitrate (molecular weight 373) by reacting together 2 - thio - 2 - (2',3' - dimethyl-5'-vinylbenzyl)isothiouronium bromide with silver nitrate.

2 - thio-2-(2',3'-dimethyl-5'-vinylbenzyl)isothiouronium bromide (molecular weight 403) by reacting together 2,3-dimethyl-5-vinylbenzyl bromide and thiourea.

2 - thio - 2 - (2,5 - dibutyl - 4 - vinylbenzyl)isothiouronium chloride (molecular weight 442) by reacting together 2,5-dibutyl-4-vinylbenzyl chloride and thiourea.

EXAMPLE 4

Styrene-[S-(vinylbenzyl)isothiouronium chloride] copolymer

A reaction charge is prepared by combining water (490 milliliters), 1 milliliter of ferric nitrate solution which contains $5 \times 10^{-4}$ grams $Fe^{+++}$, S-(vinylbenzyl)isothiouronium chloride (5 grams) and styrene (125 grams), and the resulting system adjusted to a pH of 2.6 with dilute hydrochloride acid. The reaction system is then deoxygenated with nitrogen, and 8.6 milliliters of 35 percent aqueous hydrogen peroxide added thereto with agitation at a temperature of 70° C. Stirring is thereafter continued for one hour at 70° C., and styrene (400 grams) and an additional amount of S-(vinylbenzyl)isothiouronium chloride (5 grams) in 25 milliliters of water (pH 2.8) added to the reaction mixture. The addition is carried out at a temperature of 70° C., with the styrene being added portionwise over a period of one-half hour. Following the addition of the styrene, agitation is continued and the reaction mixture is maintained at 70° C. for an additional fifteen minutes. As a result of these operations, there is obtained a styrene - [S - (vinylbenzyl)isothiouronium chloride] copolymer as a fine emulsion dispersed in water.

In a similar manner, styrene-[2-thio-2'-(3',4'-diethyl-5'-vinylbenzyl)isothiouronium acetate] copolymer; styrene-[2-thio-2'-(6'-bromo-2'-vinylbenzyl)isothiouronium bromide] copolymer; styrene-[2-thio-2'-(2'-methyl-4'-vinylbenzyl)isothiouronium nitrate] copolymer; and styrene-[2 - thio - 2' - (2',5',6'-trichloro-4-vinylbenzyl)isothiouronium acetate] copolymer are prepared by reacting styrene and the corresponding S-(vinylbenzyl)isothiouronium salt. These operations are carried out in the manner described in the foregoing paragraph with the pH of the charge being adjusted with an acid corresponding to the anion of the S-(vinylbenzyl)isothiouronium salt employed as the monomer.

EXAMPLE 5

Sodium 2-sulfoethyl methacrylate-[S-(vinylbenzyl) isothiouronium chloride] copolymer Sodium 2-sulfoethyl methacrylate (36.5 grams), S-(vinylbenzyl)isothiouronium chloride (5.0 grams), ammonium persulfate (0.5 grams) and 84 grams of water are combined together and the mixture deoxygenated with nitrogen and heated at 95° C. for two hours. Following the reaction, a portion of the reaction mixture is concentrated by evaporation under reduced pressure to obtain the 2-sulfoethyl methacrylate - S - (vinylbenzyl)isothiouronium chloride copolymer. The remainder of the reaction mixture is diluted with ethanol. During the dilution procedure the 2-sulfoethyl methacrylate-[S-(vinylbenzyl) isothiouronium chloride] copolymer precipitates as a solid material which is collected by filtration.

EXAMPLE 6

Vinyl benzyl diethanol sulfonium chloride-[S-vinylbenzyl isothiouronium chloride]-methyl acrylate terpolymer Vinyl benzyl diethanol sulfonium chloride (70 grams; 0.25 mole), S-(vinylbenzyl)isothiouronium chloride (82 grams: 0.25 mole), methyl acrylate (60 grams; 0.66 mole) are contacted together in the presence of 350 grams of water. Thereafter the reaction mixture is placed in a sealable bomb and 7 grams benzoyl peroxide catalyst added to the mixture. Following the addition of the catalyst, the ampule is deoxygenated with methane and sealed. The sealed ampule is heated at a temperature of 70° C. for 30 hours. Following the reaction period, the ampules are opened and the reaction mixture subjected to evaporation to obtain the water soluble vinyl benzyl diethanol sulfonium chloride - [S - (vinylbenzyl)isothiouronium chloride]-methyl acrylate terpolymer as a residue.

EXAMPLE 7

2-sulfoethyl methacrylate-[S-(vinylbenzyl)-isothiouronium acetate] copolymer 2-sulfoethyl methacrylate (50 grams) is dispersed in 50 milliliters of water. The pH of this dispersion is adjusted to pH 4.5 by the portionwise addition, with stirring, of 42 milliliters of 5 N NaOH solution. During the addition of the NaOH, the temperature of the reaction mixture does not exceed 25° C. Thereafter stirring is continued, 5 grams of S-(vinylbenzyl)isothiouronium chloride are added to the reaction mixture and the mixture heated slightly to effect the complete dissolution of S-(vinylbenzyl)isothiouronium chloride. Following the dissolution of the S-(vinylbenzyl)isothiouronium chloride, 0.5 gram of ammonium persulfate is added, with stirring, to the reaction mixture. The reaction mixture is then purged with helium and heated at about 95° C. for two hours with the resultant formation of a thick viscous solution. This solution is then diluted with an equal volume of water. To this diluted solution is then added, slowly, with stirring, 1 liter of methanol. During the addition of the methanol, the sulfoethyl methacrylate - [S - (vinylbenzyl)isothiouronium chloride] copolymer precipitates as a solid which is collected by filtration and dried in vacuo.

EXAMPLE 8

S-(vinylbenzyl)isothiouronium chloride-styrene butadiene terpolymer

A charge containing:

S-(vinylbenzyl)isothiouronium—(1.0 gram)
water—98 milliliters
$Fe^{+++}$—(0.2 milliliters of ferric nitrate solution which contains $Fe^{+++}$ at a concentration of $10^{-5}$ parts per million)
Hydrogen peroxide—(35 percent $H_2O_2$ in aqueous solution) 1.72 milliliters
Styrene—60 grams
Butadiene—40 grams is placed in a sealable reaction vessel and brought to a pH of 2.5 with hydrochloric acid. The resulting reaction mixture is then placed under an atmosphere of nitrogen and the reaction vessel sealed. The reaction mixture is then maintained with agitation at a temperature of 70° C. for a period of 12 hours. As a result of this operation, there is obtained a styrene-butadiene - [S - (vinylbenzyl)isothiouronium chloride terpolymer as a stable aqueous emulsion. The emulsion is in the form of a latex having a particle size of about 0.15 micron.

The copolymers of the present invention are usually obtained as water soluble materials or as aqueous dispersions of water insoluble materials. Accordingly, the monomers of the present invention are valuable as comonomeric emulsifiers for the obtention of stable aqueous dispersions of water insoluble polymer. Such stable dispersions or emulsions are obtained in the form of latexes. This valuable use for the monomer is illustrated in Example 8.

Representative interpolymers of the present invention include: 2-thio-2-(2′,3′,4′-trichloro - 5′-vinylbenzyl)isothiouronium acetate-acryanilide; 2-thio-2-(4-ter. butyl-2-vinylbenzyl)isothiouronium chloride - methacrylonitrile-ethyl acrylate; 2-thio-2-(2′,5′-diethyl-4′-vinylbenzyl)isothiouronium nitrate-1,3-butadiene; 2-thio-2-(2′,6′-dimethyl - 4′ - vinylbenzyl)isothiouroniumacetate vinylnaphthalene; 2-thio-2-(3′-propyl-5 - vinylbenzyl)isothiouronium perchlorate-3-ethylstyrene-phenyl acrylate and 2-thio-2-(2,5 - dibutyl-3-vinylbenzyl)isothiouronium nitrate-2,3-diethyl-1,3-butadiene.

The new monomers of the present invention have been found to be useful as the toxic constituent in compositions employed for the killing and control of various plant, insect, bacterial and fungal pest. For such uses, the unmodified monomer can be employed or the monomer can be dispersed on an inert finely divided solid such as talc, chalk or bentonite and employed as a dust. Also, such mixtures can be dispersed in water, with or without the aid of a surface active dispersing agent, and the resulting aqueous suspension employed as sprays, drenches or washes. In other procedures, the products can be employed as the toxic constituent in solvent solutions, oil-in-water and water-in-oil emulsions or aqueous dispersions. In representative operations, compositions containing 2-thio-2-(4-vinylbenzyl)isothiouronium chloride and 2-thio-2-(2′-vinylbenzyl)isothiouronium chloride at concentrations of 2000 parts per million by weight of ultimate composition give substantially complete kills of Southern armyworm.

The interpolymers of the present invention are useful as adhesives, binders, thickeners, saturants, sizing agents and for the production of polymeric films. Thus, they can be incorporated in paper pulp, glues and paints as thickeners and saturants and particularly to improve the wet strength of paper. They can further be employed as adhesives for paper and wood. They can also valuable as sizing agents for textile fibers such as the natural fibers and the acrylic and polyester fibers. In additional operations, they are useful for the production of films. Thus, in representative embodiments, aqueous solutions of the copolymer of Example 5 are dried in laminar form to cast and deposit clear films of excellent quality. In additional operations, the incorporation of the product of Example 6 in paper pulp improved considerably the wet burst strength of paper prepared from such material. In other operations, the product of Example 7 is an excellent thickening agent in glue.

The vinylbenzyl halide starting materials having the formula

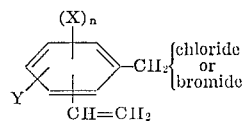

are prepared by known methods wherein (haloethyl) benzyl halides having the formula

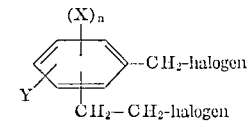

are pyrolyzed at a temperature of between 420 to 700° C. The (haloethyl)benzyl halide is heated at a temperature between 420 and 700° C. for a short period of time and at a pressure for the (haloethyl) benzyl halide vapours not exceeding about 0.2 atmosphere. Following the reaction the vapours are cooled to allow them to condense. This condensate is then fractionally distilled to obtain the desired product.

We claim:
1. The compound having the formula

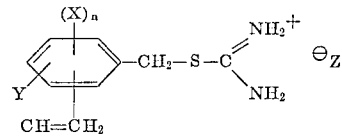

wherein Y represents hydrogen and occupies a position ortho to the vinyl substituent, X represents a member of the group consisting of chlorine, bromine and lower alkyl, Z represents an anion selected from the group consisting of —Cl$^\ominus$, —Br$^\ominus$, —NO$_3^\ominus$, —OOCCH$_3^\ominus$ and —ClO$_4^\ominus$ and $n$ represents one of the integers 0, 1, 2 and 3.

2. 2-thio-2-(4′-vinylbenzyl)isothiouronium chloride.
3. 2-thio-2-(4′-vinylbenzyl)isothiouronium bromide.
4. 2-thio-2-(4′-vinylbenzyl)isothiouronium acetate.
5. 2-thio-2-(3′-methyl-4′ - vinylbenzyl)isothiouronium chloride.
6. 2-thio-2-(3 - chloro-5′ - vinylbenzyl)isothiouronium chloride.

References Cited
UNITED STATES PATENTS

| | | | |
|---|---|---|---|
| 3,283,004 | 11/1966 | Roberts et al. | 260—564 |
| 2,906,773 | 9/1959 | Trapp | 260—465 |
| 3,179,638 | 4/1965 | Shashoua | 260—79.7 |
| 3,206,748 | 7/1966 | Nelson | 260—564 |

ROBERT V. HINES, Primary Examiner

U.S. Cl. X.R.

71—99; 117—161; 260—29.6, 29.7, 49, 79.7, 564, 651

PO-1050
(5/69)

UNITED STATES PATENT OFFICE
CERTIFICATE OF CORRECTION

Patent No. 3,642,879                    Dated  15 February 1972

Inventor(s)    David P. Sheetz and Edwin C. Steiner

It is certified that error appears in the above-identified patent and that said Letters Patent are hereby corrected as shown below:

Column 5, line 14, change "(2'-vinyl-4-methylbenzyl)" to
    --(2'-vinyl-4'-methylbenzyl)--.

Column 7, line 46, elete "can" and insert --are--.

Column 8, line 52, under References Cited, change "3,206,748" to
    --3,260,748--.

Signed and sealed this 19th day of September 1972.

(SEAL)
Attest:

EDWARD M. FLETCHER, JR.                ROBERT GOTTSCHALK
Attesting Officer                      Commissioner of Patents